UNITED STATES PATENT OFFICE.

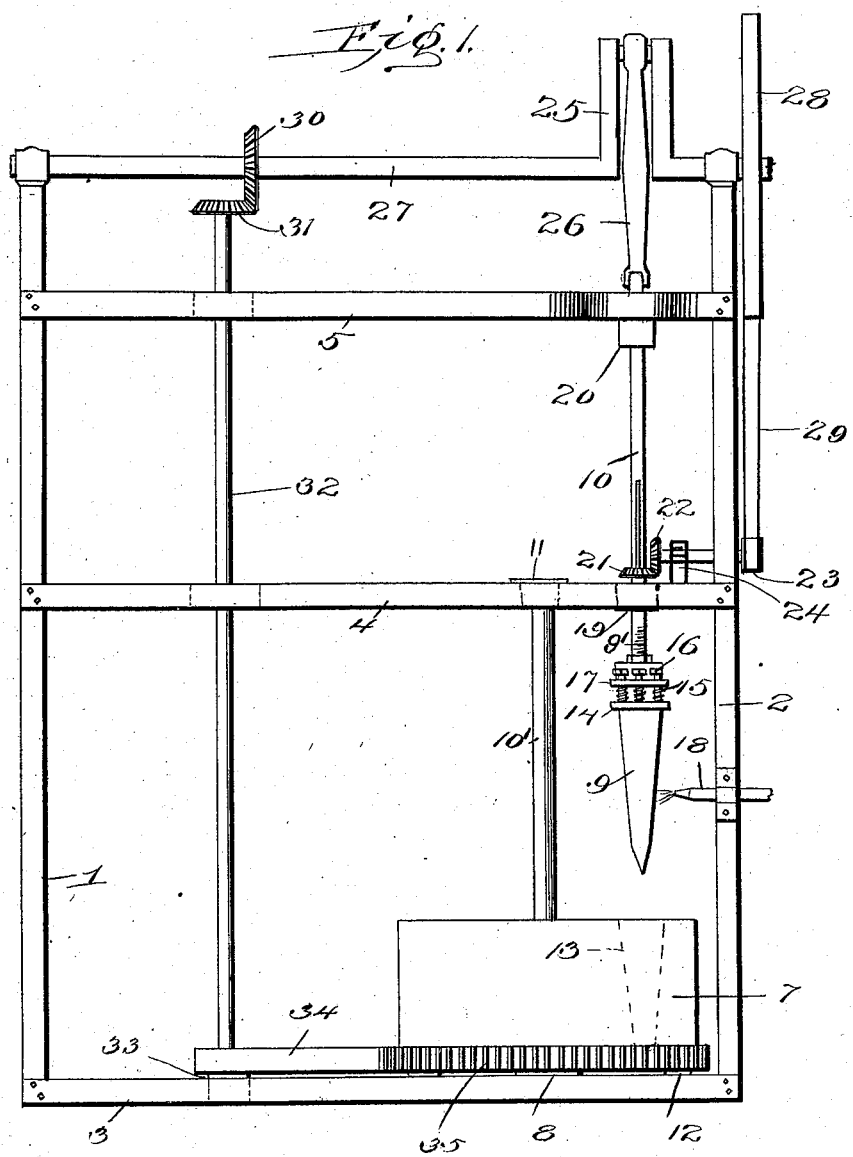

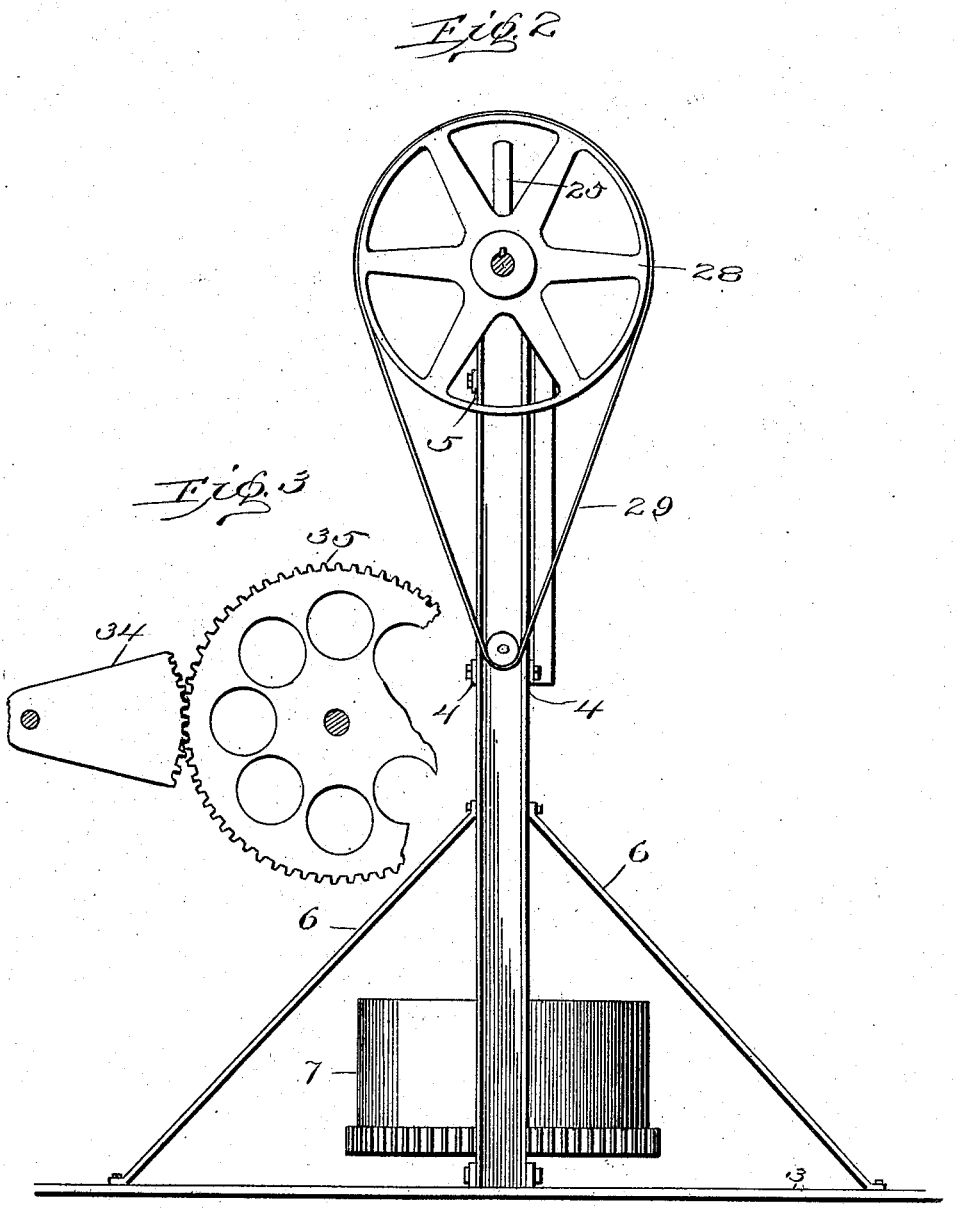

RUSSELL GARRISON AND GEORGE W. WHIPPLE, OF CHERRYVALE, KANSAS.

MACHINE FOR MOLDING CLAY CONDENSERS FOR RETORTS.

No. 915,848.            Specification of Letters Patent.        Patented March 23, 1909.

Application filed October 19, 1907. Serial No. 398,283.

*To all whom it may concern:*

Be it known that we, RUSSELL GARRISON and GEORGE W. WHIPPLE, citizens of the United States, residing at Cherryvale, in the county of Montgomery and State of Kansas, have invented certain new and useful Improvements in Machines for Molding Clay Condensers for Retorts; and we do hereby declare the following to be a full, clear, and exact description of the invention, such as will enable others skilled in the art to which it appertains to make and use the same.

This invention relates to machines for molding or producing condensers and particularly to machines for pressing the same rapidly in a compact body of uniform thickness as well as compactness.

The invention comprises the production of a rotating mold holder, a reciprocating and rotating plunger adapted to register with the molds in the mold holder and means for moving the plunger in relation to the movement of the mold holder.

The object in view is the production of a compressor or mechanism for forming condensers rapidly and in such a manner as to give to them an even pressure together with uniform thickness and smoothness on the interior.

Another object in view is the production of a mold and plunger adapted to enter therein, the plunger being formed with a covering member or lid for holding the material in the mold until the same has received a certain pressure and been compacted or pressed into a certain thickness before permitting the escape of any of the material.

Another object in view is the provision of a mold carrying frame, a plunger adapted to move into one of the molds in said frame and means for moving the plunger to the mold carrying frame in such relation that a new mold is presented to the plunger at each reciprocation thereof.

With these and other objects in view the invention comprises certain novel constructions, combinations, and arrangements of parts as will be hereinafter more fully described and claimed.

In the accompanying drawings:—Figure 1 is a side elevation of our improved invention. Fig. 2 is an edge view of Fig. 1. Fig. 3 is a top plan view of a mold carrying frame and gears for operating the same.

In providing clay compressors for various articles as condensers and the like, it is desirable to make a structure that will form the article as rapidly as possible, but in addition to rapidly forming the article, the device must be able to compress the clay to a predetermined compactness so as to provide an article that will not easily break and one that will be substantially perfect, that is, without air holes and the like.

It is among the objects of the present invention to provide a machine which will automatically compress clay and compress the same to a predetermined degree of compactness and to do the same rapidly and without waste of energy or of material.

Referring more particularly to the drawings 1 and 2 indicate the uprights of the frame and 3 the base. Suitable cross members or braces 4—4 and 5—5 are provided for bracing the upright and also for forming means between which bearings may be positioned as hereinafter more fully described. The uprights are braced by any suitable means as braces 6 for preventing the same from getting out of alinement.

Mounted upon base 3 is a mold carrying frame 7 which is pivotally mounted on a journal member 8 and held in proper position for receiving a plunger 9 by means of the shaft 10' that is in turn journaled at 11 in a journal box positioned between braces or members 4—4. In order to provide means for positively holding the frame 7 in position and to assist in resisting pressure from plunger 9, an antifriction member 12 is positioned below frame 7 and substantially in line with plunger 9 as clearly seen in Fig. 1. By this means whenever plunger 9 is forced downward into any of the molds 13, frame 7 will not be displaced in the least. As clearly seen in Fig. 3 the molds 13 are positioned in frame 7 in a circle so that as the same is rotated one mold after the other may be brought beneath the plunger 9 and a condenser formed.

The plunger 9 is provided with a body portion that is designed to fit into one of the molds 13 so as to compress the material therein to a certain thickness. In order to keep the material from being forced out of the molds a cover or lid 14 is secured to plunger 9 and engages the top of the mold before the plunger 9 reaches its extreme movement. This will hold the material in the mold until the same has been compressed to a certain degree. When any additional pressure is brought upon the material it will cause the same to lift the lid 14 so that all superfluous material may escape from the mold. The lid 14 may be regulated so as to provide different amounts of tension to be overcome before the material in the mold will be permitted to escape. Suitable means as springs 15 and set screws 16 are provided for this purpose. The set screws 16 are threaded in the lid 14 but are loosely mounted in member 17 which is rigidly secured to member 9 so that any pressure brought to bear upon lid 14 will force upward bolts or set screws 16, compressing springs 15. In addition to these means for compressing the material in mold 13 the plunger 9 is adjustably secured at 9' to a reciprocating rod or member 10. This is so arranged as to permit the plunger to enter to a greater or less extent into the mold so as to vary the thickness of the article molded.

In order to permit the plunger 9 to be withdrawn from the mold easily and without causing any of the material therein to adhere to the same a spraying member 18 is provided for spraying water upon the plunger 9. By continuously spraying water upon plunger 9 the same not only is easily withdrawn from the mold 13 without removing any clay therefrom but also will evenly and smoothly form the inside of the condenser or article being formed especially as plunger 9 is rotated as hereinafter described.

A reciprocating rod 10 is used to force plunger 9 into mold 13 and is designed to be journaled or positioned in a journal box 19 so as to permit a reciprocatory movement of rod 10 and also plunger 9. Splined upon rod 10 is a gear 21 that is designed to mesh with gear 22 which in turn is rotated by pulley 23 acting through rod 24. From this it will be seen that whenever pulley 23 is rotated bar 10 is also rotated together with plunger 9. This movement is in addition to the reciprocatory movement of rod 10 so that plunger 9 may move down into one of the molds 13 and then back out of the same and at the same time rapidly rotating for giving a smooth or polished surface to the interior of the article being formed. A suitable union or swivel joint 20 permits of such rotation, and there is sufficient space between the bowed portions of the bars 5 on opposite sides of the framework to allow for the movement of the member 26. Rod 10 is moved by means of a crank 25 and a connecting member or shaft 26. Crank 25 is rigidly secured to a rod 27 and is preferably formed from the same piece of material as seen in Fig. 1. Rod or shaft 27 is designed to be driven by any suitable power not shown. Mounted upon rod 27 near upright 2 is a comparatively large drive wheel 28 that transmits motion to pulley 23 through suitable means as belt 29 so that whenever shaft 27 moves, and consequently rod 10 moves, gears 21 and 22 will also in turn move and rotate rod 10. Wheel 28 is designed to be comparatively large while pulley 3 is designed to be comparatively small so that rod 10 and plunger 9 will rotate a number of times at each up and down movement.

Secured at any convenient point along shaft 27 is a gear 30 that is designed to mesh with gear 31 for rotating a vertical shaft 32 that is journaled in suitable bearings mounted between braces 5—5 and 4—4. Gears 30 and 31 are designed to be of the same size so that for one rotation of shaft 27 shaft 31 will also rotate a single time. The lower end of the shaft 32 is journaled in a journal bearing 33 and in addition carries a segmental rack 34 that is designed to mesh with a gear wheel 35 which in turn is rigidly secured to frame 7. The segmental rack 34 is designed to be of such a size as to feed one mold 13 forward at each rotation of shaft 32, so that when plunger 9 leaves one of the molds 13 segment 34 will engage gear 35 and turn frame 7 until the next mold contained therein is positioned under plunger 9. When the last mentioned mold has been moved to its correct position segment 34 will have moved past gear 35. During the remaining rotation of segment 34, frame 7 will remain stationary and during this stationary period plunger 9 will move downward into the mold and form the article therein and again move out as the segment 34 again engages gear wheel 35.

By the provision of reciprocating and rotating plunger and means for moving a new mold beneath the plunger automatically presents a structure in which condensers and the like may be formed rapidly and substantially perfect in structure. By the present construction of the adjustability of the plunger any desired pressure may be brought upon the material being molded especially in view of the cap that resists any removing or squeezing out of the material unless the same has received a predetermined compactness. The provision of the plunger arranged to receive a spray of water continuously also presents the advantage of forming a smooth and polished interior of the condenser.

What we claim is:—

1. In a clay molding device, a framework, a rod arranged to rotate and reciprocate therein, a plunger carried by said rod, a mold, a mold cover, a spring connection between said cover and plunger, and an adjustable device for varying the tension of the spring, such spring-pressed cover arranged to be raised by the surplus material permitted to escape from the mold when said material has been compressed to a predetermined degree.

2. In a clay molding machine, a framework, a main shaft, a rod arranged to rotate and reciprocate therein, a pitman connected with said shaft, means connecting said pitman and rod and permitting the rotation of the latter while having a reciprocating motion imparted thereto, a plunger carried by the rod, a gear carried by the main shaft, a mold-carrying frame, means operated by the gear for rotating the mold-carrying frame, a gear slidably connected with the reciprocating rod, a gear driven from the main shaft and meshing with the gear last mentioned, a mold cover, a spring connection between said cover and plunger, an adjustable device for varying the tension of the spring, such spring-pressed cover arranged to be raised by the surplus material permitted to escape from the mold when said material has been compressed to a predetermined degree.

In testimony whereof we affix our signatures in presence of two witnesses.

RUSSELL GARRISON.
GEORGE W. WHIPPLE.

Witnesses:
CHARLES FLETCHER,
C. W. ROSEBERRY.